United States Patent
Kühl

Patent Number: 6,071,012
Date of Patent: Jun. 6, 2000

[54] STRAIGHT-LINE MECHANISM ADJUSTABLE WITHOUT PLAY

[75] Inventor: Hans Kühl, Plochingen, Germany

[73] Assignee: Hans Kuehl, Germany

[21] Appl. No.: 08/882,928

[22] Filed: Jun. 26, 1997

[30] Foreign Application Priority Data

Jun. 26, 1996 [DE] Germany .......................... 196 25 551

[51] Int. Cl.[7] .................................................. F16C 29/02
[52] U.S. Cl. ................................................. 384/41; 384/42
[58] Field of Search .................. 384/41, 42, 40, 384/26, 7

[56] References Cited

U.S. PATENT DOCUMENTS 4,630,941  12/1986  Chainer et al. .............................. 384/7

FOREIGN PATENT DOCUMENTS

| 05290471B1 | 3/1993 | European Pat. Off. |
| 928133 | 5/1955 | Germany . |
| 47-15844 U | 3/1971 | Japan . |
| 60-51007 U | 4/1985 | Japan . |
| 55-68720 U | 11/1988 | Japan . |
| 1-118225 U | 8/1989 | Japan . |
| 3-94404 U | 9/1991 | Japan . |
| 5-27307 U | 4/1993 | Japan . |
| 6-226572 | 8/1994 | Japan . |
| 348581 | 8/1960 | Switzerland . |
| 351852 | 7/1931 | United Kingdom . |
| 548782 | 10/1942 | United Kingdom . |

OTHER PUBLICATIONS

G. Niemann, Maschinen–elemente (Machine Elements), vol. 1, Construction and Calculation of Connections, Bearings, Shafts ($2^{nd}$ edition), Springer–Verlag Berlin, Heidelberg, New York, p. 381 (1981).

*Primary Examiner*—Lenard A. Footland
*Attorney, Agent, or Firm*—Evenson, McKeown, Edwards & Lenahan, P.L.L.C.

[57] ABSTRACT

In order to eliminate a joining play and a wear play in a straight-line mechanism with a straight guiding member and a carriage sliding on this guiding member, it is provided to equip the guiding surfaces of the guiding member and of the carriage with mutually coordinated profiles. Each of the profiles has at least one wedge which extends in the sliding direction and rises in the circumferential direction and the parts having the profiles can be rotated with respect to one another.

15 Claims, 3 Drawing Sheets

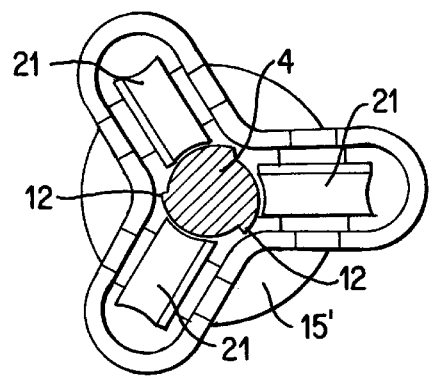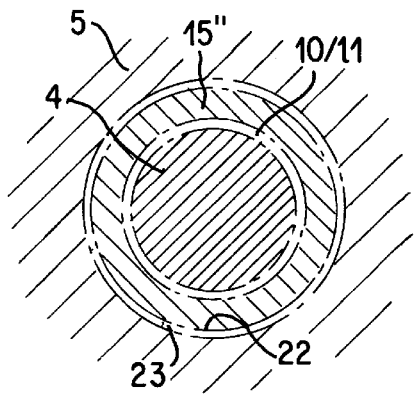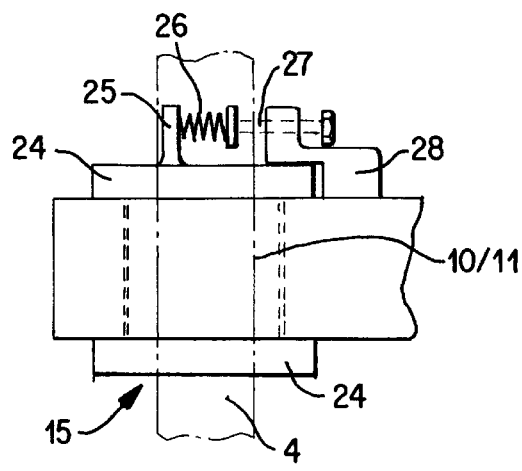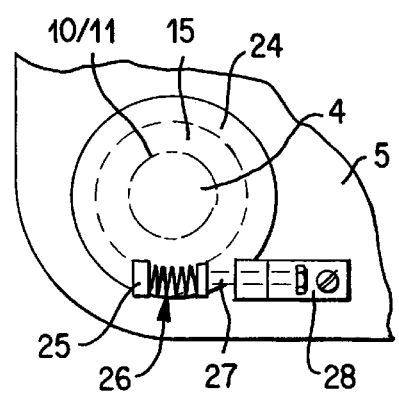

STRAIGHT-LINE MECHANISM ADJUSTABLE WITHOUT PLAY

BACKGROUND AND SUMMARY OF THE INVENTION

This application claims the priority of German application 196 25 551.1-14 filed in Germany on Jun. 26, 1996, the disclosure of which is expressly incorporated by reference herein.

The invention relates to a straight-line mechanism for slidable carriages in machine tools, having at least one straight, essentially cylindrical guiding member on which the carriage is guided.

Machine tools in the sense of the invention are those which have a slidable carriage which carries either at least one tool for machining at least one workpiece or at least one workpiece which is to be machined by at least one tool and permits a linear relative movement between the tool and the workpiece. Machine tools of this type are, for example, drilling aggregates, milling machines, grinding machines, broaching machines, injection molding machines, and the like.

As a rule, very high demands are made on the linearity of the relative movement between the tool and the workpiece and on its centricity with respect to a reference line. The acceptable machining tolerances can be maintained only if manufacturing tolerances of the machine tool as well as the wear of the guiding surfaces of the carriage can be compensated into the $\mu$-range.

Accordingly, it is an object of the invention to reduce or completely eliminate also a very slight play between the guiding member and the carriage, in which case partially the displaceability of the carriage on the guiding member is maintained, but partially also eliminated and should be permitted only by means of special measures.

For achieving this object, the invention uses the idea of an earlier invention which is described and illustrated in detail in German Patent 41 09 530 and to which reference is made in this regard. In this patent, a shaft/hub connection is disclosed by which a firm connection is achieved by means of mutually coordinated profiles in a shaft and in a hub in the form of cylindrical wedges by rotating the two parts with respect to one another. These profiles each consist of at least one wedge-shaped cam which radially rises over an imaginary cylinder surface on an interior part and correspondingly of at least one wedge-shaped cam which radially rises toward the inside over an imaginary cylinder surface of a slightly larger diameter in an exterior part, which cams drop down again steeply onto the cylinder surfaces. In each arrangement the fixed connection is achieved in that the two parts are rotated so far with respect to one another that a permanent self-locking frictional engagement occurs between the parts to be connected. The frictional engagement can be eliminated without disturbance by rotating the parts back and can also be established again.

In contrast, the present invention first provides that the two parts equipped with the cylindrical wedge profiles be rotated only to such an extent that initial necessary joining play is eliminated, but the parts can still slide on one another and mainly a future wear can be compensated. By means of the invention, an intended play between the parts sliding on one another can therefore not only be initially set in a simple and precise manner but can also be adjusted later.

For this purpose, preferred embodiments of the invention provide for an arrangement of the above-noted general type, wherein the profile of the guiding member has at least three wedges which radially rise over an imaginary cylinder surface on the guiding member, are each offset by equal angles from one another in the circumferential direction and extend in a longitudinal direction of the guiding member, and wherein the profile assigned to the carriage has correspondingly arranged wedges which radially rise toward the inside over an imaginary cylinder surface of a slightly larger diameter in the carriage, and wherein the angular position of the parts having the profiles can be changed with respect to one another.

As a result, it is achieved that by rotating the parts containing the cylindrical wedge profiles, the mutual distance of the wedge surfaces and a resulting play caused by the joining play or by wear between these parts is increasingly reduced and finally eliminated or insufficient surface pressure between the parts is maintained at the intended level.

The necessary mutual rotating of the parts provided with the cylindrical wedge profiles can take place by rotating the guiding member about its longitudinal axis. However, since, as a rule, this guiding member also contributes to the stiffness of the machine tool, it is preferably provided to arrange the cylindrical wedge profiles assigned to the carriage in a bush which can be rotated in the carriage.

From German Patent Document DE 41 09 530, it is known to arrange one of the interacting profiles in a collar which can be exchanged when wear has occurred. However, this collar cannot be rotated and can therefore not be used for compensating play.

The invention can be carried out with only one cylindrical wedge pair which extends along almost the whole circumference of the guiding surface. However, preferably it is provided to equip the profiles with a plurality of wedge pairs which are arranged at equal distances, particularly with three pairs of wedges, each offset by 120°.

The slope of the cylindrical wedges can amount to between 1:50 and 1:200. A slope of 1:100 was found to be advantageous in many applications.

The invention can be implemented by means of only one guiding member, which is provided with the wedge profile, for a carriage. In order to prevent an uncontrolled rotating of the carriage around the guiding member, another guiding member must then be provided which, however, needs to operate only as a protection against torsion and needs to have no influence on the exact guiding of the carriage. However, as a rule, at least two guiding members are provided, for example, in the form of column guides which are then both equipped with the profiles according to the invention.

A moving of the carriage which is easy despite a most narrow adjustment can be achieved if the cylinder wedge profiles assigned to the carriage are arranged on the circumference of rotatably disposed rollers. Here also, preferably three rollers are provided which are offset by 120° with respect to one another. These rollers are then also disposed in a bush which can be rotated about the longitudinal axis of the guiding member and can be fixed.

The rotating of the bush can take place manually, in which case the bush can be clamped onto the carriage by means of clamping screws which reach through concentric oblong holes.

In another embodiment, the bush can be rotationally loaded by a spring such that it is automatically rotated and adjusted when a play occurs. The force of the spring can be adjustable such that at least approximately a certain surface pressure is maintained between the wedge surfaces which slide on one another.

This automatic adjusting of the bush can have the purpose of automatically compensating occurred wear. Since at least the surface pressure and possibly even the play between the wedge surfaces depends also on the temperature of the parts sliding on one another which increases with the operating time, the automatic adjusting device can be used also for compensating these temperature-dependent operating conditions. In this case, the bush, which is cold and therefore narrow when the machine is started, can be rotated back and can then be rotated forward by the force of the spring until the endeavored surface pressure occurs in the case of the respective condition of the bush. As the operating temperature increases at which the bush rotates, the surface pressure is reduced which, however, is continuously compensated by the additional rotating of the bush under the force of the spring.

Since the rotating angles of the bush for the compensation of the changeable surface pressure, of the changeable play or of the wear are low, an endeavored surface pressure is kept uniform within narrow limits.

In another embodiment, the bearing surfaces between the bush and the carriage have profiles in the form of cylindrical wedges by means of which, as illustrated in the initially mentioned invention, they can be rotated as well as clamped in the carriage in the form of a shaft/hub connection which is fixed in this case. The two profile pairings may have the same slope. So that, during an adjusting of the bush for compensating any play between the bush and the guiding column, the frictional engagement between the bush and the carriage will not rise excessively, it is preferably provided that the profile pairing between the bush and the carriage has a lower slope of, for example, 1:200 than the profile pairing between the bush and the guiding member of, for example, 1:100.

As mentioned, the present invention first provides that the two parts equipped with the cylinder wedges be rotated only so far that the displaceability of the carriage on the guiding member is maintained. However, in some cases, it is desirable that the carriage can be locked. As a result, a so-called "rattling" of the tools, which can considerably shorten their useful life, can be avoided. Such a locking of the carriage on the guiding member can easily be achieved by means of the present invention in that the bush is rotated so far that the play between the bush and the carriage is not only largely reduced but completely eliminated and a clamping is therefore achieved. If a displacement of the carriage is to take place nevertheless, this clamping must temporarily be eliminated again.

A first possibility according to the invention exists for this purpose in that pressure oil can be introduced into the bearing surface of a bush with respect to the guiding member at such a high pressure that the bush "floats" on the guiding member and the carriage is again displaceable. When the oil pressure is reduced, the locking is reestablished.

Another possibility for temporarily eliminating the clamping consists of rotating the bush by means of an adjusting element, for example, in the form of a hydraulic cylinder so far (back) and thus to increase the play between the bush and the guiding member to such an extent that no more clamping will exist.

Other objects, advantages and novel features of the present invention will become apparent from the following detailed description of the invention when considered in conjunction with the accompanying drawings.

BRIEF DESCRIPTION OF THE DRAWINGS

FIG. 5 is a cross-sectional view of a guide with rollers and with the cylinder wedge profile on their circumference, constructed according to other preferred embodiments of the present invention;

FIG. 6 is a cross-sectional view of a bush for showing the fastening of the bush by means of cylinder wedge profiles, constructed according to preferred embodiments of the present invention;

FIG. 7 is a view of an automatic adjusting device of a bush, constructed according to preferred embodiments of the present invention;

FIG. 8 is the top view of the object of FIG. 7;

DETAILED DESCRIPTION OF THE DRAWINGS

Figure 1:
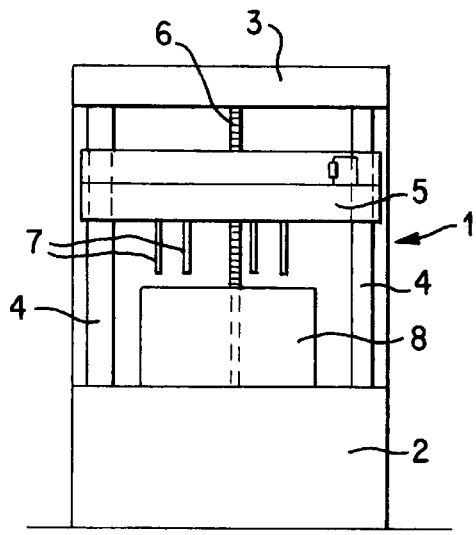
FIG. 1 is a view of a machine tool with two guiding members in the form of guiding columns, constructed according to preferred embodiments of the present invention.

The machine tool 1 of FIG. 1, for example, a drilling aggregate, has a machine frame with a bottom box 2, a top box 3 and two lateral guiding columns 4 on which a tool carriage 5 can be moved up and down by means of a threaded spindle 6. In the carriage 5, the tools—for example, four drills—are disposed by means of which the workpiece 8 is machined. The advance of the drills 7 takes place by lowering the carriage 5. In this case, the precision of the drilling pattern depends on the precision of the guiding of the carriage 5 on the guiding columns 4.

Figure 2:
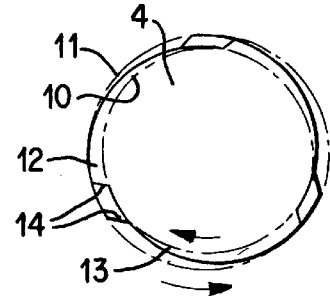
FIG. 2 is a cross-sectional view of the parts of the FIG. 1 machine tool carrying the profile, which shows the operating principle of the cylinder wedge profile.

The guiding columns 4 are provided with a profile 10, which in FIG. 2 is very magnified for a better clarity and to which a corresponding profile 11 corresponds in the guiding bore in the carriage 5. These profiles 10, 11 consist of at least one wedge; in the illustrated example, of three wedges 12 which are offset with respect to one another in each case by 120° and whose circumferential surfaces 13 gradually rise over reference surfaces which are cylindrical with respect to the longitudinal axis and are indicated by dash-dotted lines—on the guiding column 4, toward the outside; in the part guided on it, toward the inside—and drop back onto these reference surfaces at a steep slope 14.

The two parts—guiding column 4 and carriage 5—which contain the profiles 10, 11 can be rotated with respect to one another so that, during the rotation in the direction of the arrows, the distance between the circumferential surfaces 13 of the wedges 12 is increasingly reduced and can finally to brought to zero. In this case, the three wedges 12, which are offset with respect to one another, cause a precise centering of the parts with respect to one another. During a further rotation, the surface pressure between the wedge surfaces is increased more and more.

Figure 3:
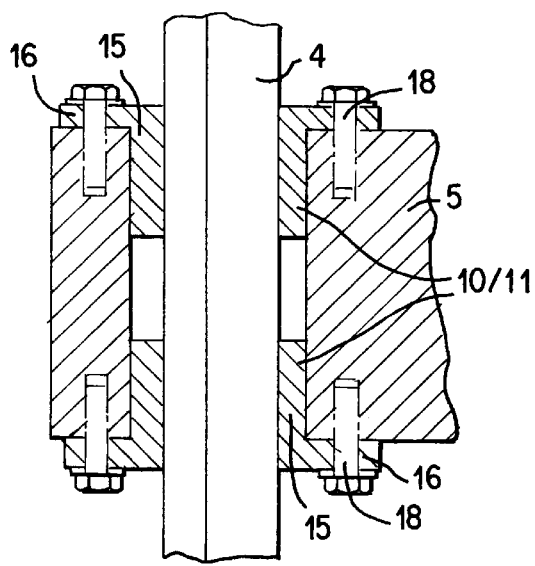
FIG. 3 is a longitudinal sectional view of a double guide of a carriage on a guiding member, constructed according to preferred embodiments of the present invention.

The guiding columns 4 may be rotatable per se. However, since, as in the present example, they are frequently also part of the machine frame and since, as a rule, the carriage 5 cannot be rotatable, according to the invention, the profile assigned to the carriage is arranged in a bush 15 which, in turn, is rotatably disposed in the carriage. In order to avoid a tilting-up of the carriage 5 under the effect of the machining pressure of the tools 8 laterally offset with respect to the guiding columns, as illustrated in FIG. 3, two bushes 15 respectively in the carriage at a mutual distance are assigned to each guiding column 4. The bushes 15 are provided with a collar 16 in which oblong holes 17 are arranged which are illustrated particularly in FIG. 4 and which are penetrated by clamping screws 18 which can be screwed into the carriage and by means of which the bushes can be locked in their respective rotating position. The collar 16 of the bushes 15 can have grooves 19 to which a key 20 for rotating the bushes can be applied which key 20 is indicated by a broken line.

Since the slope of the wedges 12 is so low that it cannot be illustrated in its true size in the scale of the figures, the profiles 10, 11 in the drawing are usually indicated only by their broken-line reference surface.

During the inserting of the carriage 5, the bushes 15 have a position in which the steep slopes 14 of the profiles 10, 11 on the guiding columns 4 and in the bushes 15 are adjacent to one another. The resulting large joining play facilitates the inserting of the carriage. Subsequently, the bushes 15 are rotated so far that the play between the bushes and the guiding columns 4 is eliminated without impairing the easy sliding of the carriage 5. In this position, the bushes 15 are locked by means of the clamping screws 18. If then, after a fairly long operating time, play has occurred again because of wear between the bushes 15 and the guiding columns 4, this play can be compensated again after the release of the clamping screws 18 by a further rotating of the bushes.

The circumferential surfaces 13 of the wedges 12 may be cylindrical; however, their curvature advantageously follows the course of a logarithmic spiral; that is, it has a uniform slope along the circumference because then, in all rotating positions of the profiles 10, 11 with respect to one another, the surface pressure is the same by way of the wedge surfaces. This reduces the wear of the circumferential surfaces 13 of the profiles 10, 11 which slide on one another during the displacement of the carriage 5. If then, after a multiple adjusting of the bushes 15, the bearing surfaces of the carrying circumferential surfaces 13 of the profiles 10, 11 have become too small, the bushes 15 can be exchanged. Advantageously, the bushes 15 therefore consist of a bearing material of a lower resistance to wear than the guiding columns 4 so that wear is shifted mainly to the bushes which are easier to exchange.

According to FIG. 5, a possibility of reducing the wear and of achieving an easy movement of the carriage 5 consists of placing the profile 11 assigned to the carriage in the circumference of rollers 21 which are rotatably disposed in an also rotatable bush 15'. The circumferential surfaces of these rollers 21 have the curved wedge 12 on the circumference of the guiding column 4 as the generatrix. Here also, by means of rotating the bush 15' and, with it, the rollers 21, the play can be adjusted between the rollers and the guiding column 4 so that there is no play.

Figure 4:
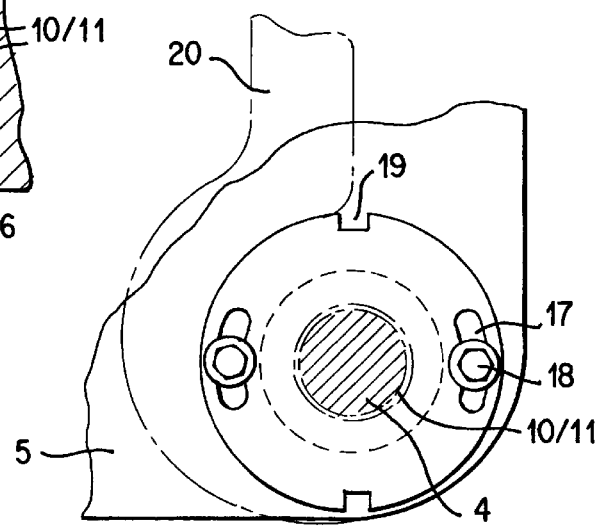
FIG. 4 is a top view of the object of FIG. 3.

Another possibility of making a bush rotatable and lockable in the carriage 5 is illustrated schematically in FIG. 6 in which, as in FIG. 4, the profiles are indicated only by means of their reference surfaces. Here, the bush 15" is not rotatable in a cylindrical bearing in the carriage 5 but, also on its exterior side, has a profile 22 with wedges which are curved around the circumference of the bush to which a corresponding profile 23 in the carriage 5 is assigned. By the rotation of the bush 15", an original joining play in the profile pairing between the bush and the carriage 5 can be eliminated and the bush can be clamped in the carriage by means of a self-locking frictional engagement.

So that, by means of this rotating of the bush 15", on the one hand, the bush is fastened in the carriage 5 by means of the profile pairing 22/23 but, on the other hand, the play between the bush and the guiding column 4 can also be adjusted by means of the profile pairing 10/11, the sliding profile pairing 10/11 between the bush and the guiding column 4 has a larger joining play and advantageously also a larger slope than the frictionally engaged profile pairing 22/23 between the bush and the carriage.

When the profile pairing between the bush and the guiding column has a slope of, for example, 1:100 and a joining play of, for example, $^{40}/_{1,000}$ mm, the profile pairing between the bush and the carriage will have a slope of, for example, 1:200 and a joining play of, for example, $^{5}/_{1,000}$ mm. A rotating angle of 1° reduces the gap in the profile pairing 22/23 with the slope 1:200 by approximately $^{4}/_{1,000}$ mm; in the profile pairing 10/11 with the slope 1:100 by approximately $^{8}/_{1,000}$ mm. After the joining of the parts, in the case of an angle of rotation of slightly more than 1°, the joining play of the profile pairing 22/23 between the bush 15" and the carriage is compensated. In the case of a further rotation, the surface pressure in this profile pairing is increased. If then, in the case of a rotating angle of approximately 5°, the joining play in the profile pairing 10/11 between the bush and the guiding column 4 is compensated, the profile pairing 22/23 has already reached the frictional engagement so that the bush is fastened in the carriage 5 while is can still slide on the guiding column. A further rotating of the bush 15" for increasing the surface pressure between the profile pairing 10/11 or for compensating wear between the bush and the guiding column 4 only increases the frictional engagement in the profile pairing 22/23.

As a result, it is achieved that the bush 15" alone achieves the required play-free adjusting of the guiding of the carriage 5 on the guiding column, while the bush always remains clamped in the carriage.

The bush can be rotated by means of the key 20 by manual feeling. A torque measuring element may also be integrated in the key 20 in order to permit an objective adjustment of the surface pressure or of the play in the profile pairing 10/11.

As illustrated in FIG. 7, the bush 15 can also be disposed in the carriage 5 in a freely rotatable manner in which case it is secured by collars 24 against an axial displacement. An energy accumulator, in the illustrated embodiment, a pressure spring 26, is applied to a lug 25 of the bush 15, which pressure spring 26 is supported on an adjusting screw 27 which can be screwed into a stationary support piece 28. The pressure spring 26 loads the bush 15 by means of a torque which can be adjusted by means of the adjusting screw 17 and which endeavors to rotate the bush in the sense of a reduction of the play between the profile pairing 10/11. By way of this adjustable torque, the surface pressure between the wedge surfaces of the profiles 10 and 11 can be adjusted.

The pressure spring 26 can also be constructed as a tension spring or as a torsion (coil or spiral) spring according to other embodiments contemplated by the invention. A fluidic (hydraulic or pneumatic) operating element can also be used as the energy accumulator whose exercised force is adjustable.

A balance occurs between the torque exercised by the energy accumulator and the surface pressure of the wedge surfaces of the profile pairing 10/11. If this balance is disturbed by the reduction of the surface pressure or because of wear or only because of an increase of the diameter of the bush 15 in the case of an operationally caused heating, by means of the pressure spring 26 the bush is automatically and immediately rotated so far that this equilibrium is reestablished and the surface pressure is therefore maintained at the desired value.

While, in the above-described embodiments of the invention, the carriage 5 was always slidable on the guiding column 4, there are also cases in which the carriage is to be fixed in a machining operation in order to definitely not yield under any loads. However, it should nevertheless by displaceable.

In order to achieve this by means of the present invention, it is provided to rotate at least one bush 15 on each guiding column 4 so far that a frictional engagement occurs between the bush and the guiding column and the carriage 5 is therefore fixed.

Figure 9:
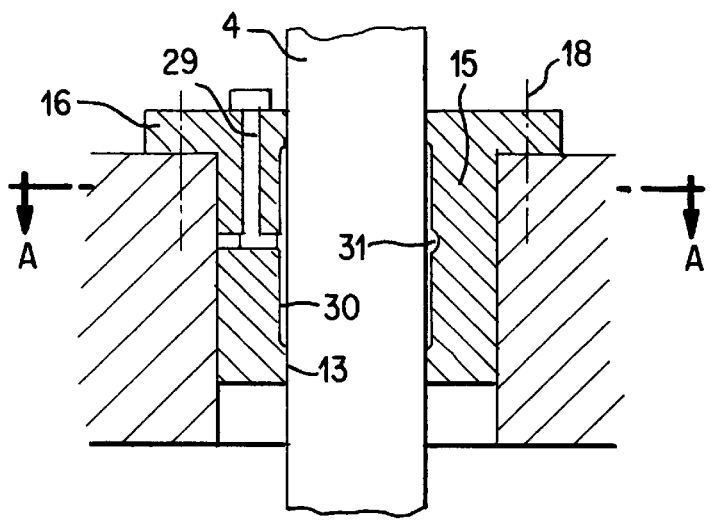
FIG. 9 is a longitudinal sectional view of a bush for showing the possibility for eliminating the clamping between the bush and the guiding member, constructed according to preferred embodiments of the present invention.
Figure 10:
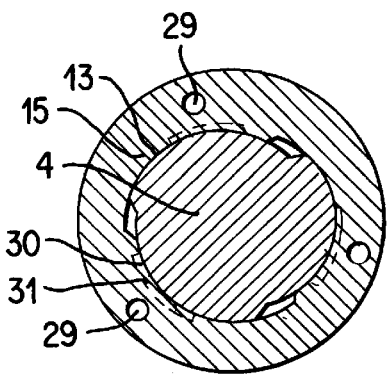
FIG. 10 is a cross-sectional view of the object of FIG. 7 in the plane A—A of this figure.

In order to nevertheless be able to displace the carriage 5, according to a first variant according to FIG. 9, axially parallel lines 29 and pockets 30 are provided in the bush 15 on the circumferential surfaces 13 of the wedges 12 of the profile 11 in the bush. As illustrated in the cross-sectional view of FIG. 10, several, for example, three pockets 30 are arranged on each wedge surface 13 which are each connected with one another by a distributing groove 31 and are supplied by a separate pressure oil line 29. The starting area of a wedge surface 13 remains free of pockets 30 because it is released as the rotating position of the bush 15 increases and would then let the pressure oil flow out. In the drawing, the pockets 30 are very magnified; their depth is only approximately 1/10 mm.

When the carriage 5 is to be displaced, pressure oil is supplied by way of the lines 29 into the pockets 30 at such a high pressure that the bush 15 "floats" on the forming oil film and the carriage becomes displaceable. When the oil pressure is lowered, the frictional engagement is reestablished.

Figure 11:
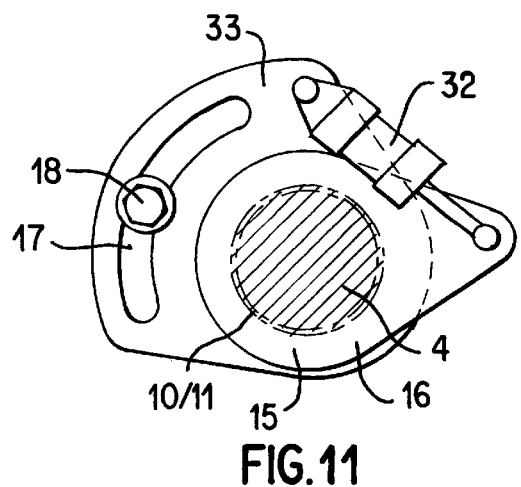
FIG. 11 is a top view of another possibility for eliminating the clamping between the bush and the guiding member, constructed according to preferred embodiments of the present invention.

In a second embodiment according to FIG. 11, it is provided to apply a fluidic (pneumatic or hydraulic) operating element 32 to the collar 16 of the bush 15, which operating element 32 is linked on the other side to an adjustable connecting link 33. In its rotating position, the connecting link 33 can be adjusted on the carriage 5 and can be fixed by means of a clamping screw 18. By means of this connecting link 33, in one of the end positions of the operating element 32, the clamping position of the bush 15 is fixed in which the frictional engagement exists between the bush and the guiding column 4.

When this frictional engagement is to be eliminated and the carriage 5 is to be displaced, the operating element 32 is activated and, as a result, the bush 15 is rotated so far that the frictional engagement is released. By the reversing of the operating element 32, the bush 15 is returned into the starting position and the frictional engagement is reestablished. It is understood that the operating direction of the operating element 32 must be coordinated with the slope direction of the wedges 12 in the profiles 10, 11.

The above-described automatic rotating of the bush by mean s of an operating element according to FIG. 11, in conjunction with a spring loading of the bush according to FIGS. 7 and 8, may have the purpose of easing an excessively narrow play between the bush and the guiding column , which may have occurred, for example, during the cooling of an operationally warm bush, by rotating the bush back by means of the operating element and then, by means of the pressure spring automatically reestablishing the desired value.

The above-described embodiments of the invention on a machine tool with carriages which can be moved up and down on vertical guiding columns can also be implemented, according to other contemplated embodiments, on machine tools with horizontally movable carriages in the case of which the function of the guiding columns is taken over by guiding members in the form of horizontal guiding rods.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A straight-line mechanism for a slidable carriage in machine tools, the straight-line mechanism comprising:

at least one straight, essentially cylindrical guiding member on which a carriage is guided along a longitudinal direction of the guiding member, running surfaces between the guiding member and the carriage which have mutually coordinated profiles, wherein the profile of the guiding member has at least three wedges which radially rise over a first imaginary cylinder surface on the guiding member, the three wedges are each offset by equal angles from one another in the circumferential direction and extend in the longitudinal direction, wherein the profile assigned to the carriage has correspondingly arranged wedges which radially rise inwardly from a second imaginary cylinder surface in the carriage, the second imaginary cylinder surface having a slightly larger diameter than the first imaginary cylinder surface, wherein a relative angular position between the guiding member and the carriage allow for slidable motion in the longitudinal direction relative to each other, and wherein the profile assigned to the carriage is arranged in a bush which is disposed to the carriage to be rotatable about the longitudinal axis of the guiding member.

2. A straight-line mechanism according to claim 1, wherein the bush can be locked in the carriage in its rotating position.

3. A straight-line mechanism according to claim 1, wherein the profiles have three wedges respectively which are offset by 120°, and wherein the wedges have a slope of from 1:50 to 1:200.

4. A straight-line mechanism according to claim 3, wherein the slope of the wedge surfaces follows the course of a logarthmic spiral.

5. A straight-line mechanism for a slidable carriage in machine tools, the straight-line mechanism comprising:

at least one straight, essentially cylindrical guiding member on which a carriage is guided along a longitudinal direction of the guiding member, running surfaces between the guiding member and the carriage which have mutually coordinated profiles, wherein the profile of the guiding member has at least three wedges which radially rise over a first imaginary cylinder surface on the guiding member, the three wedges are each offset by equal angles from one another in the circumferential direction and extend in the longitudinal direction, wherein the profile assigned to the carriage has correspondingly arranged wedges which radially rise inwardly from a second imaginary cylinder surface in the carriage, the second imaginary cylinder surface having a slightly larger diameter than the first imaginary cylinder surface, wherein a relative angular position between the guiding member and the carriage allow for slidable motion in the longitudinal direction relative to each other, and wherein the wedges have a slope of from 1:50 to 1:200.

6. A straight-line mechanism for a slidable carriage in machine tools, the straight-line mechanism comprising:

at least one straight, essentially cylindrical guiding member on which a carriage is guided along a longitudinal direction of the guiding member, running surfaces between the guiding member and the carriage which have mutually coordinated profiles, wherein the profile of the guiding member has at least three wedges which radially rise over a first imaginary cylinder surface on the guiding member, the three wedges are each offset by equal angles from one another in the circumferential direction and extend in the longitudinal direction, wherein the profile assigned to the carriage has correspondingly arranged wedges which radially rise inwardly from a second imaginary cylinder surface in the carriage, the second imaginary cylinder surface having a slightly larger diameter than the first imaginary cylinder surface, wherein a relative angular position between the guiding member and the carriage allow for slidable motion in the longitudinal direction relative to each other, and wherein the slope of the wedge surfaces follows the course of a logarthmic spiral.

7. A straight-line mechanism for a slidable carriage in machine tools, the straight-line mechanism comprising:

at least one straight, essentially cylindrical guiding member on which a carriage is guided along a longitudinal direction of the guiding member, running surfaces between the guiding member and the carriage which have mutually coordinated profiles, wherein the profile of the guiding member has at least three wedges which radially rise over a first imaginary cylinder surface on the guiding member, the three wedges are each offset by equal angles from one another in the circumferential direction and extend in the longitudinal direction, wherein the profile assigned to the carriage has correspondingly arranged wedges which radially rise inwardly from a second imaginary cylinder surface in the carriage, the second imaginary cylinder surface having a slightly larger diameter than the first imaginary cylinder surface, wherein a relative angular position between the guiding member and the carriage allow for slidable motion in the longitudinal direction relative to each other, and wherein the parts having the profiles can be rotated and fixed with respect to one another until the parts run play-free on one another.

8. A method for straight-line guidance of a slidable carriage in a machine tool, the method comprising the acts of:

(a) providing at least one essentially cylindrical guiding member for a carriage, (b) providing mutually coordinated profiled guide surfaces for the guiding member and the carriage, the guide surfaces of the guiding member radially rising over an imaginary cylinder surface, the guide surfaces of the carriage radially rising over a second imaginary cylinder surface with a slightly larger diameter, the guide surfaces of the guiding member and the carriage each forming wedges having a slope ranging from 1:50 to 1:200, and (c) arranging the guide surfaces of the guiding member and the carriage in an angular position relative to each other to limit rotative play therebetween while allowing slidable movement of the carriage relative to the guiding member in a longitudinal direction, thereby providing a highly precise linear guidance for the slidable carriage along the guide member.

9. A method for straight-line guidance of a slidable carriage in a machine tool, the method comprising the acts of:

(a) providing at least one essentially cylindrical guiding member for a carriage, (b) providing mutually coordinated profiled guide surfaces for the guiding member and the carriage, the guide surfaces of the guiding member radially rising over an imaginary cylinder surface, the guide surfaces of the carriage radially rising over a second imaginary cylinder surface with a slightly larger diameter, the guide surfaces of the guiding member and the carriage each forming wedges having a slope that follows the course of a logarithmic spiral, and (c) arranging the guide surfaces of the guiding member and the carriage in an angular position relative to each other to limit rotative play therebetween while allowing slidable movement of the carriage relative to the guiding member in a longitudinal direction, thereby providing a highly precise linear guidance for the slidable carriage along the guide member.

10. A method for straight-line guidance of a slidable carriage in a machine tool, the method comprising the acts of:

(a) providing at least one essentially cylindrical guiding member for a carriage, (b) providing mutually coordinated profiled guide surfaces for the guiding member and the carriage, the guide surfaces of the guiding member radially rising over an imaginary cylinder surface, the guide surfaces of the carriage radially rising over a second imaginary cylinder surface with a slightly larger diameter, the guide surfaces of the guiding member and the carriage each forming wedges, the wedges associated with the carriage arranged on the circumference of rollers which run on the guiding member, and (c) arranging the guide surfaces of the guiding member and the carriage in an angular position relative to each other to limit rotative play therebetween while allowing slidable movement of the carriage relative to the guiding member in a longitudinal direction, thereby providing a highly precise linear guidance for the slidable carriage along the guide member.

11. A method for straight-line guidance of a slidable carriage in a machine tool, the method comprising the acts of:

(a) providing at least one essentially cylindrical guiding member for a carriage, (b) providing mutually coordinated profiled guide surfaces for the guiding member and the carriage, the guide surfaces of the guiding member radially rising over an imaginary cylinder surface, the guide surfaces of the carriage radially rising over a second imaginary cylinder surface with a slightly larger diameter, wherein the guide surfaces of the carriage are arranged in a bush disposed in the carriage, and are rotatable about a longitudinal axis of the guiding member, wherein the bush can be locked in the carriage in a rotating position, the bush being held in an essentially cylindrical bearing in the carriage, the bearing having bearing guide surfaces which can engage outer bush guide surfaces, the bearing guide surfaces and the outer bush guide surfaces being mutually coordinated and each having at least one wedge rising in the circumferential direction, a frictional engagement between the bearing guide surfaces and the outer bush guide surfaces, wherein the slope of the wedges formed by the bearing guide surfaces and the outer bush guide surfaces is lower than the slope of the wedges formed by the guide surfaces of the bush and the guiding member, and (c) arranging the guide surfaces of the guiding member and the carriage in an angular position relative to each other to limit rotative play therebetween while allowing slidable movement of the carriage relative to the guiding member in a longitudinal direction, thereby providing a highly precise linear guidance for the slidable carriage along the guide member.

12. A straight-line mechanism for a slidable carriage in machine tools, the straight-line mechanism comprising:

at least one straight, essentially cylindrical guiding member on which a carriage is guided along a longitudinal direction of the guiding member, running surfaces between the guiding member and the carriage which have mutually coordinated profiles, wherein the profile of the guiding member has at least three wedges which radially rise over a first imaginary cylinder surface on the guiding member, the three wedges are each offset by equal angles from one another in the circumferential direction and extend in the longitudinal direction, wherein the profile assigned to the carriage has correspondingly arranged wedges which radially rise inwardly from a second imaginary cylinder surface in the carriage, the second imaginary cylinder surface having a slightly larger diameter than the first imaginary cylinder surface, wherein a relative angular position between the guiding member and the carriage allow for slidable motion in the longitudinal direction relative to each other, and wherein at least two of said guiding members are provided in parallel to each other, said carriage being guided along said at least two guiding members.

13. A method for straight-line guidance of a slidable carriage in a machine tool, the method comprising the acts of:

(a) providing at least one essentially cylindrical guiding member for a carriage, (b) providing mutually coordinated profiled guide surfaces for the guiding member and the carriage, the guide surfaces of the guiding member radially rising over an imaginary cylinder surface, the guide surfaces of the carriage radially rising over a second imaginary cylinder surface with a slightly larger diameter, wherein the guide surfaces of the carriage are arranged in a bush disposed in the carriage, and are rotatable about a longitudinal axis of the guiding member, wherein the wedges have a slope of from 1:50 to 1:200, and (c) arranging the guide surfaces of the guiding member and the carriage in an angular position relative to each other to limit rotative play therebetween while allowing slidable movement of the carriage relative to the guiding member in a longitudinal direction, thereby providing a highly precise linear guidance for the slidable carriage along the guide member.

14. A method for straight-line guidance of a slidable carriage in a machine tool, the method comprising the acts of:

(a) providing at least one essentially cylindrical guiding member for a carriage, (b) providing mutually coordinated profiled guide surfaces for the guiding member and the carriage, the guide surfaces of the guiding member radially rising over an imaginary cylinder surface, the guide surfaces of the carriage radially rising over a second imaginary cylinder surface with a slightly larger diameter, the guide surfaces of the carriage are arranged in a bush disposed in the carriage, and are rotatable about a longitudinal axis of the guiding member, wherein the wedges have a slope that follows the course of a logarithmic spiral, and (c) arranging the guide surfaces of the guiding member and the carriage in an angular position relative to each other to limit rotative play therebetween while allowing slidable movement of the carriage relative to the guiding member in a longitudinal direction, thereby providing a highly precise linear guidance for the slidable carriage along the guide member.

15. A method for straight-line guidance of a slidable carriage in a machine tool, the method comprising the acts of:

(a) at least two essentially cylindrical guiding members in parallel to each other for a carriage said carriage being guided along said at least two guiding members, and (b) providing mutually coordinated profiled guide surfaces for the guiding member and the carriage, the guide surfaces of the guiding member radially rising over an imaginary cylinder surface, the guide surfaces of the carriage radially rising over a second imaginary cylinder surface with a slightly larger diameter, and (c) arranging the guide surfaces of the guiding member and the carriage in an angular position relative to each other to limit rotative play therebetween while allowing slidable movement of the carriage relative to the guiding member in a longitudinal direction, thereby providing a highly precise linear guidance for the slidable carriage along the guide member.

* * * * *